Patented Oct. 19, 1943

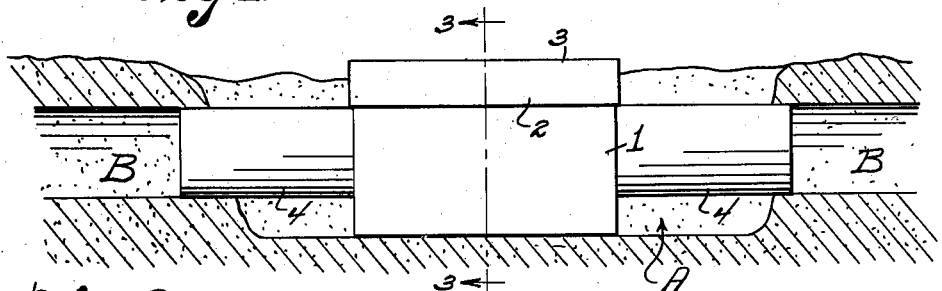
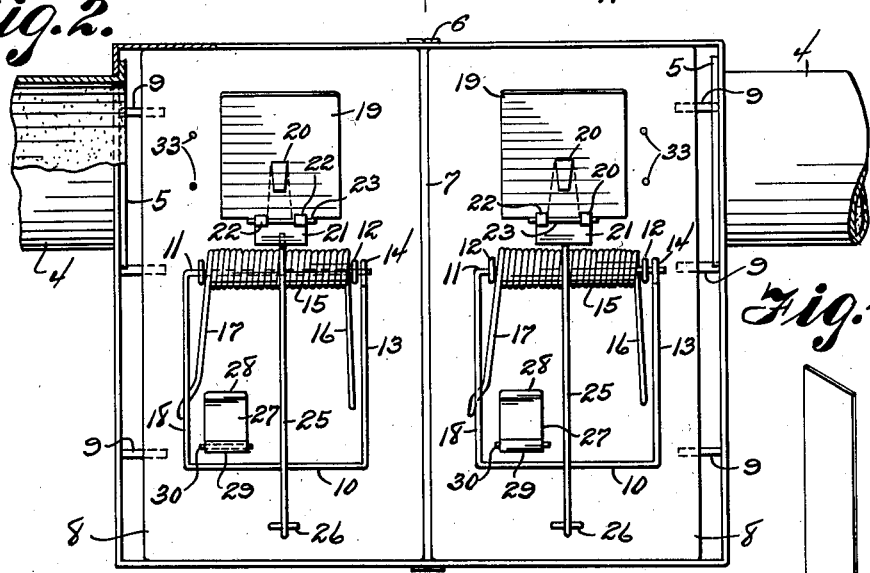
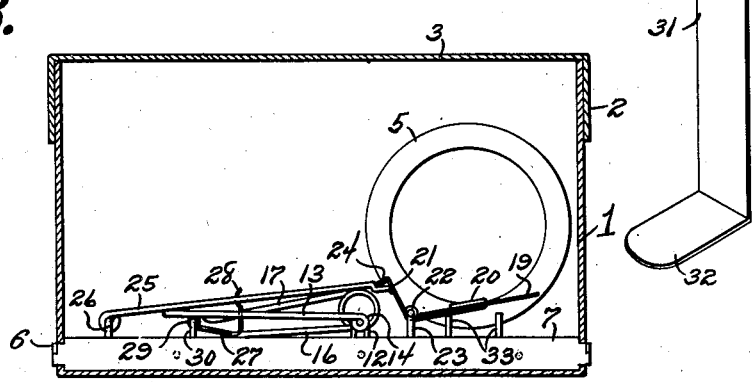

2,332,334

UNITED STATES PATENT OFFICE 2,332,334

ANIMAL TRAP

George H. Morrison, Fruitport, Mich.

Application October 3, 1941, Serial No. 413,520

3 Claims. (Cl. 43—81)

This invention relates to animal traps, and its general object is to provide a trap that is primarily designed for catching moles and other burrowing rodents, in that the trap can be associated with the tunnel or runway made by and frequented by the animal, without causing suspicion on the part of the animal of the presence of the trap.

A further object is to provide a trap of the character set forth, that can be associated with the runway of the animal, in an easy and expeditious manner, and can be arranged to set position without fear of injury to the person, as a safety device is provided for that purpose.

Another object is to provide an animal trap that includes a housing having tubular entrance means for disposal within the runway of the animal, to direct the latter within the housing and in contact with means to catch and kill the animal.

A still further object is to provide an animal trap that includes a housing to be associated with a runway of a burrowing animal, and has one or more catching or trap units therein, the units being readily applicable and removable with respect to the housing, without disturbing the latter.

Another object is to provide an animal trap that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a side elevation of my trap and illustrates the same in use or associated with the runway of a burrowing animal.

Figure 2 is a top plan view, with the lid or cover of the housing removed, and parts in section, as well as with the said units in set position.

Figure 3 is a sectional view taken approximately on line 3—3 of Figure 1, looking in the direction of the arrows.

Figure 4 is a perspective view of the tool or unit holder for applying and removing the units with respect to the housing.

Referring to the drawing in detail, the letter A indicates a substantially rectangular hole made in the ground to intersect a runway B of a burrowing animal such as a mole, the hole being adapted for receiving the body 1 of the housing of my trap, and after the housing is properly positioned therein, the hole may be filled with earth to a level even with or adjacent to the lower edge of the depending flange 2 of a closure lid 3 for the body.

The housing is preferably made from sheet metal in rectangular formation to provide the body with side and end walls, the latter each having a circular opening adjacent one end thereof, and the openings are disposed in alignment with each other as indicated in Figure 2. Each opening is adapted to receive an entrance tube 4 that is removable from the body to facilitate properly positioning the trap relative to the runway, and in a manner which will be later described. Each tube is provided with an exteriorly arranged annular flange 5 at one end thereof to bear against the inner face of the end walls to hold the tubes attached to the body.

Secured to and bridging the side walls of the body midway the ends thereof and having one longitudinal edge resting on the bottom wall, is a relatively narrow strip 7 that divides the lower portion of the body into what may be termed a pair of compartments, each providing a seat for a trap unit and the strip is preferably secured to the side walls by reducing the ends of the strip to provide tabs 6 mounted through slots in the side walls, and bending the tabs against the outer faces of the walls. The strip is preferably formed from sheet metal folded along its longitudinal center with a pair of tabs 7 at each end, and the tabs of each pair are bent in opposite directions against the walls, as clearly shown in Figure 2.

Each trap unit includes a flat rectangular base 8 that is preferably made from wood and of a length to snugly fit within its seat, but of less width than that of its seat to allow ready removal of the unit therefrom. In placing the units within their seats, one side or longitudinal edge of each base thereof is disposed against the partitioning strip 7 and secured to and extending from the opposite longitudinal edge of the bases are pins 9 to engage the end walls of the body, as clearly shown in Figure 2, to hold the units against displacement.

It will be noted that the units are identical and each unit also includes a spring pressed jaw 10 made from a single strand of wire in frame formation, the jaw being mounted for swinging movement by having one strand portion 11 extending through spaced parallel staples 12 fixed to the base 8, and one side strand portion 13 terminates into an eye 14 having the free end of the portion 11 mounted therein for securing the strand in its frame formation, as set forth. Sleeved on the portion 11 between the staples 12 is a coil spring 15 that terminates at its ends into fingers 16 and 17 respectively, the finger 16 having its free end engaged with the base, and the free end of the finger 17 is engaged with the other side strand portion 18 for urging and normally holding the jaw to and in animal catching position.

The treadle 19 which is relatively large, is made from sheet metal in square plate formation, as best shown in Figure 2 and is provided with a slot arranged substantially centrally thereof. Underlying the treadle is a tongue 20 that is formed on a trigger 21, the tongue extending substantially at a right angle from the trigger and is reduced or tapered toward its outer end, as well as extended through the slot of the treadle and bent against the upper face thereof for securing the treadle to the tongue, as best shown in Figure 3. Formed on the trigger upon opposite sides of the juncture of the tongue 20 therewith are bearing collars 22 that are mounted on the bight portion of an inverted substantially U-shaped staple 23 which is fixed to the base 8. By this construction, it will be obvious that the trigger is mounted for rocking movement and carries the tongue and treadle.

The trigger is relatively long and its free upper longitudinal edge parallels the secured strand portion 11 of the jaw, and is bent to provide a flange 24 for receiving the right angle bent free end of a lever 25 for holding the jaw in set position against the action of its spring, and the opposite end of the lever 25 is loosely connected to a staple 26 that is fixed to the base 8 adjacent the end thereof opposite the treadle, as shown in Figures 2 and 3.

A safety device is provided for holding the jaw in partial set position, against the action of its spring, while setting the lever relative to the trigger, and the safety device includes a hook like latch member formed from sheet metal to provide angularly arranged portions 27 and 28, the portion 27 being formed with a sleeve 29 mounted on a staple 30 secured to the base, while the portion 28 terminates in a curved free end to facilitate hooking the device about the jaw, when the device is swung on its staple to a position opposite to its normal position shown.

The tool for applying and removing the units with respect to the housing is made from a strip of metal bent at right angles adjacent one end to provide a relatively long handle 31 and a unit engaging portion or head 32 having a rounded outer end. The units are preferably handled through the medium of the tool or holder, merely by inserting the head 32 between the coil spring 15 and the base 8.

In applying the trap in use, the body of the housing is first positioned within the hole A and the tubes 4 are then inserted through the openings in the end walls for disposal within the runway, as shown in Figure 1, and with the flanges engaged with the inner faces of the end walls. Prior to placing the units within the body of the housing, the jaws are first swung against the action of their springs and held accordingly by their safety devices. The units are then disposed within the body by the tool of Figure 4. When properly positioned within the body, the levers 25 are disposed in place relative to the triggers and the safety devices are then moved to their released or normal position, as shown, and preferably by the tool. The lid 3 is thence applied to the body and the hole is finally filled to a level substantially even with the lower edge of the lid.

When an animal is caught, the unit having the animal therein is removed from the housing by the tool. The animal is removed from the unit and the latter is again replaced within the housing and set in the manner referred to.

I may also provide impaling pins 33 that are secured to and rise from the bases 8 laterally of the treadles, it being understood that the pins 34 are for the purpose of penetrating the body of an animal when caught by the jaws so as to prevent any possibility of the animal escaping from the trap.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A trap for association with a runway of a burrowing animal, comprising a housing including bottom, side and end walls and an open top, a lid for closing the top, said end walls each having an opening therein adjacent one end and the openings aligning with each other, an entrance tube for each opening removably and telescopically mounted therein to extend exteriorly of the housing for disposal in the runway, a pair of trap units removably mounted within the housing and each including a spring pressed jaw, means for holding the jaw in set position against the action of the spring thereof, a treadle for each holding means to release the latter from its jaw, and the treadles being aligned with the tubes.

2. A trap for association with a runway of a burrowing animal, comprising a housing including bottom, side and end walls and an open top, a lid for closing the top, said end walls each having an opening adjacent one end and the openings aligning with each other, an entrance tube for each opening and removably mounted therein to extend exteriorly of the housing for disposal in the runway, a flange on the inner end of each tube to engage the inner face of its end wall to hold the tube in place, a strip secured to and bridging the side walls midway the ends thereof to provide a pair of seats within the housing, a trap unit for each seat and including a rectangular base mounted therein with one side of the base engaged with the strip, pins secured to and extending from the opposite sides of the bases and engaged with the end walls of the housing, a spring pressed jaw for each unit and swingingly connected to the base thereof, means for holding the jaws in set position against the action of the springs thereof, a treadle for each holding means to release the latter from its jaw, and the treadles being aligned with the tubes.

3. A trap for association with a runway of a burrowing animal, comprising a housing including bottom, side and end walls and an open top, a lid for closing the top, said end walls each having an opening therein adjacent one end and the openings aligning with each other, an entrance tube for each opening slidably and removably mounted therein to extend exteriorly of the housing for disposal in the runway, a pair of trap units removably mounted within the housing and each including a spring pressed jaw, means for holding the jaw in set position against the action of the spring thereof, and a treadle for each holding means to release the latter from its jaw, the treadles being aligned with the tubes.

GEORGE H. MORRISON.